(12) United States Patent
Voss et al.

(10) Patent No.: US 12,448,797 B2
(45) Date of Patent: Oct. 21, 2025

(54) FALL ARREST ROOF MOUNT ANCHOR

(71) Applicant: SAYFA R&D PTY LTD, Boronia (AU)

(72) Inventors: Murray Voss, Boronia (AU); Barry Voss, Boronia (AU)

(73) Assignee: SAYFA R&D PTY LTD, Boronia (AU)

( * ) Notice: Subject to any disclaimer, the term of this patent is extended or adjusted under 35 U.S.C. 154(b) by 47 days.

(21) Appl. No.: 18/001,924

(22) PCT Filed: Aug. 15, 2022

(86) PCT No.: PCT/AU2022/050890
§ 371 (c)(1),
(2) Date: Dec. 15, 2022

(87) PCT Pub. No.: WO2023/019295
PCT Pub. Date: Feb. 23, 2023

(65) Prior Publication Data
US 2024/0102302 A1    Mar. 28, 2024

(30) Foreign Application Priority Data
Aug. 17, 2021 (AU) .................. 2021902563

(51) Int. Cl.
*E04G 21/32* (2006.01)
*A62B 35/00* (2006.01)
*A62B 35/04* (2006.01)

(52) U.S. Cl.
CPC ........ *E04G 21/328* (2013.01); *A62B 35/0068* (2013.01); *A62B 35/04* (2013.01); *E04G 21/3214* (2013.01); *E04G 21/3276* (2013.01)

(58) Field of Classification Search
CPC .............. E04G 21/328; E04G 21/3214; E04G 21/3276; E04G 21/3261; E04G 21/329;
(Continued)

(56) References Cited

U.S. PATENT DOCUMENTS 5,287,670 A * 2/1994 Funaki .................. E04D 3/3608
52/520
5,732,974 A 3/1998 Sayles
(Continued)

FOREIGN PATENT DOCUMENTS

AU        2008100070 A4    2/2008
CN          104288935 A    1/2015
(Continued)

OTHER PUBLICATIONS

International Search Report & Written Opinion dated Oct. 26, 2022 from PCT Application No. PCT/AU2022/050890.
(Continued)

*Primary Examiner* — Robert Canfield
(74) *Attorney, Agent, or Firm* — INNOVATION CAPITAL LAW GROUP, LLP; Vic Lin (57) ABSTRACT

A fall arrest roof mount anchor is designed to secure construction and maintenance personnel working at heights, utilising harness and lanyard fall protection equipment. The roof mount anchor comprises a mounting plate having a uniform cross-section defining a raised central portion and side portions for roof attachment. The raised central portion has a swivel eye anchor point for attachment of conventional height safety harness hardware.

19 Claims, 6 Drawing Sheets

(58) Field of Classification Search
CPC ....... E04G 3/26; A62B 35/0068; A62B 35/04; A62B 35/0037; Y02E 10/47
USPC ............ 182/3, 45; 248/237; 52/23, 24, 698, 52/704, 710
See application file for complete search history.

(56) References Cited

U.S. PATENT DOCUMENTS

| | | | |
|---|---|---|---|
| 6,640,511 B1* | 11/2003 | Link | E04D 5/147 52/410 |
| 8,453,794 B2 | 6/2013 | Melic | |
| 9,611,652 B2* | 4/2017 | Haddock | F24S 25/636 |
| 9,687,683 B2 | 6/2017 | Jones et al. | |
| 9,856,900 B1 | 1/2018 | Strange et al. | |
| 10,443,896 B2* | 10/2019 | Haddock | F24S 25/615 |
| 11,306,490 B1* | 4/2022 | Blow | E04G 3/265 |
| 11,603,675 B2* | 3/2023 | Nichols | A62B 35/0068 |
| 11,698,166 B1* | 7/2023 | Ryan | C21D 8/005 248/205.1 |
| 11,725,688 B2* | 8/2023 | Meine | F16B 43/001 52/698 |
| D1,013,901 S* | 2/2024 | Voss | D8/354 |
| 2003/0182893 A1* | 10/2003 | Poldmaa | E04D 13/12 52/749.12 |
| 2004/0007150 A1* | 1/2004 | Gleave | E04D 13/10 104/106 |
| 2004/0227038 A1* | 11/2004 | Strasser | B60K 15/07 248/74.1 |
| 2005/0284694 A1 | 12/2005 | Faye et al. | |
| 2007/0144830 A1* | 6/2007 | Mastenbroek | E04G 21/329 182/3 |
| 2010/0326767 A1 | 12/2010 | Guthrie et al. | |
| 2011/0214388 A1* | 9/2011 | London | E04G 21/328 52/745.21 |
| 2012/0067667 A1 | 3/2012 | Marcoux | |
| 2013/0087669 A1 | 4/2013 | Daddio | |
| 2016/0010792 A1* | 1/2016 | Pass | F16M 13/02 248/231.91 |
| 2016/0257284 A1 | 9/2016 | Farooq et al. | |
| 2018/0264297 A1* | 9/2018 | Poldmaa | A62B 35/04 |
| 2018/0318616 A1 | 11/2018 | Ballantyne | |
| 2020/0164237 A1* | 5/2020 | Teiner | E04G 21/329 |
| 2021/0095475 A1* | 4/2021 | Zheng | F16B 33/004 |
| 2023/0203817 A1* | 6/2023 | Shadwell | F16M 13/02 248/237 |
| 2023/0349181 A1* | 11/2023 | Voss | E04G 21/328 |

FOREIGN PATENT DOCUMENTS

| | | |
|---|---|---|
| EP | 2961898 B1 | 4/2018 |
| GB | 2515341 A | 12/2014 |
| IT | MI20102117 A1 | 5/2012 |
| WO | 2002044496 A1 | 6/2002 |
| WO | 2006021794 A1 | 3/2006 |
| WO | 2014171831 A1 | 10/2014 |
| WO | 2016176721 A1 | 11/2016 |
| WO | 2019161496 A1 | 8/2019 |

OTHER PUBLICATIONS

International type search dated Oct. 14, 2021 from Australian Application No. 2021902563.
Extended European Search Report dated Jul. 11, 2024 from European Application No. 22818160.8, 8 pages.

* cited by examiner

FALL ARREST ROOF MOUNT ANCHOR

FIELD OF THE INVENTION

This invention relates generally to a fall arrest roof mount anchor.

BACKGROUND OF THE INVENTION

Fall arrest roof mount anchors are used for industry applications involving high fall risk, to secure harnessed construction and maintenance personnel working at heights on buildings and structures.

These height safety anchors may comprise a formed aluminium extrusion mounting plate which is permanently affixed to a roof profile surface, and which exposes a swivel eye anchor point for attachment of a carabiner, lanyard and other conventional harness hardware.

The present invention seeks to provide a fall arrest roof mount anchor which will overcome or substantially ameliorate at least some of the deficiencies of the prior art, or at least to provide an alternative.

It is to be understood that, if any prior art information is referred to herein, such reference does not constitute an admission that the information forms part of the common general knowledge in the art, either in Australia or any other country.

SUMMARY OF THE DISCLOSURE

There is provided herein a fall arrest roof mount anchor ideally suited to construction and maintenance personnel working at heights, utilising a harness and lanyard fall protection equipment.

The fall arrest roof mount anchor has a mounting plate having a uniform cross-section defining a raised central portion and side portions for roof attachment.

The raised central portion has a swivel eye anchor point.

The mounting plate further comprises channel wall portions projecting from an under surface of the raised central portion thereby defining an integrally formed channel therebetween, which runs longitudinally along the under surface of the raised central portion and coincides with the swivel eye anchor point.

The uniform cross-section and the under channel enhance shear force resilience and flexural stiffness to lateral applied strain, especially when applied along a longitudinal axis of the channel. The under channel coincides with the swivel eye anchor point, thereby maximising the shear force resilience conferred by the under channel at the point of fall arrest loading.

As such, the present roof mount anchor may be structurally resilient yet lightweight. For example, an aluminium extrusion embodiment of the present anchor may be rated to 15 kN yet only weigh 800 g.

The under channel may further be configured to conveniently capture a locknut of an anchor bolt whilst yet allowing a distal end of the anchor bolt to extend therebetween.

The roof attachment side portions may comprise a plurality of rivet fastener holes which collocate along a length of the horizontal axis and are spaced rows in across the horizontal axis. Spacing of the rivet fastener holes along the rows accommodate specific crest-to-crest dimensions of various roof profile surfaces, wherein the rivet fasteners are spaced apart in at least two intervals of 14 mm, 28 mm, 42 mm, 230 mm, 245 mm and 274 mm from an edge of each roof attachment side portion of the mounting plate.

As such, the connection of the side portions of the mounting plate across two roof profile ribs dissipates the load over a greater area and enhances fall arrest rated performance. Furthermore, installation across two ribs prevents or reduces potential for roof sheet delamination, which could occur when a roof mount is fixed with rivets to one roof sheet only.

The roof mount anchor may incorporate a unique energy absorbing swivel eye lanyard attachment point, eliminating carabiner out and providing uniform load distribution to the mounting plate in a fall arrest situation. The increased energy absorption properties and ability to be installed across two roof sheets allows fixture to lighter structures and roof decks.

Specifically, the mounting plate may comprise a matrix of elongate stress relief cut-outs surrounding the swivel eye anchor point. The stress relief cut-outs may arc concentrically around the swivel eye anchor point, and the ends of radially adjacent stress relief cut-outs may overlap.

This unique energy deforming matrix arrangement allows the mounting plate to flex around the swivel eye anchor point, thereby dissipating energy in a shock load situation without compromising the structural integrity of the remainder of the mounting plate.

The swivel eye anchor point may comprise a lanyard connector attached to the centre of the raised central portion arch apex. The lanyard connector may have an anchor connection aperture being elongate along a strain absorbing axis through proximal and distal ends of the lanyard connector, and wherein the anchor connection aperture has a curved frail web across the strain absorbing axis and wherein the frail web is orientated with an apex towards the anchor bolt.

The curved frail web and the inverse orientation thereof are designed to absorb energy and reduce shock impact on the user, whilst also providing a visual indicator of abnormal loading (such as in excess of 7 kN), which is useful when undertaking routine inspection of the fall arrest system. The inverse orientation in particular provides improved visual indication of gradual energy absorption deformation, as compared to the opposite orientation.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
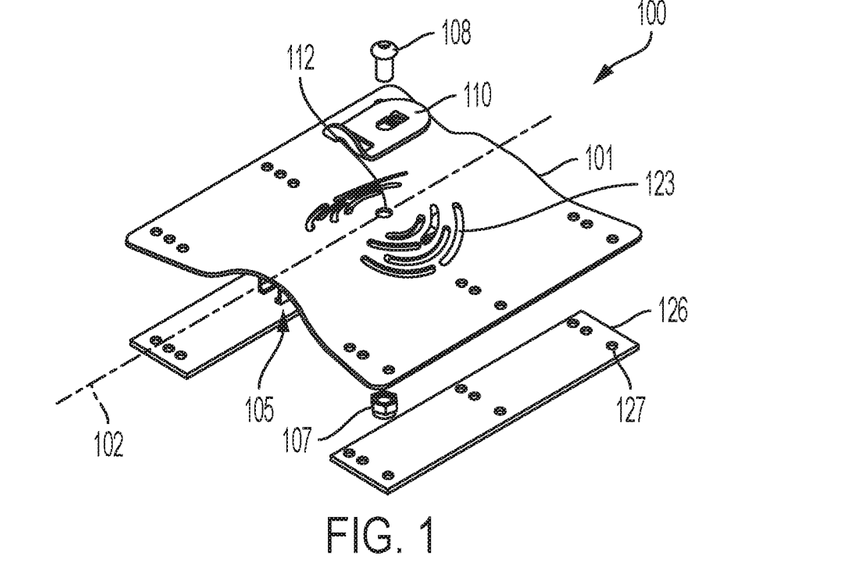
FIG. 1 shows a perspective view of a fall arrest roof mount anchor in accordance with an embodiment.
Figure 2:
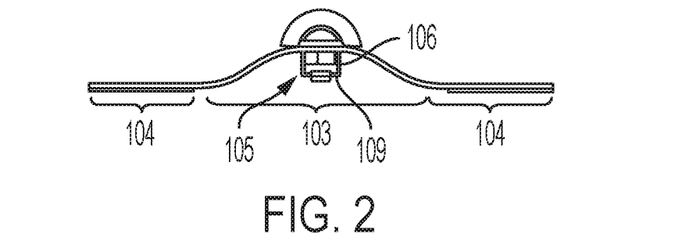
FIG. 2 shows a uniform vertical cross-section view of the roof mount anchor.

With reference to FIGS. 1 and 2, a fall arrest roof mount anchor 100 has a mounting plate 101 having a uniform cross-section along a length of a horizontal axis 102 thereof. The cross-section defines a raised central portion 103 and roof attachment side portions 104.

The mounting plate 101 may preferably be metallic and further preferably aluminium and manufactured using an extrusion process.

Figure 9:
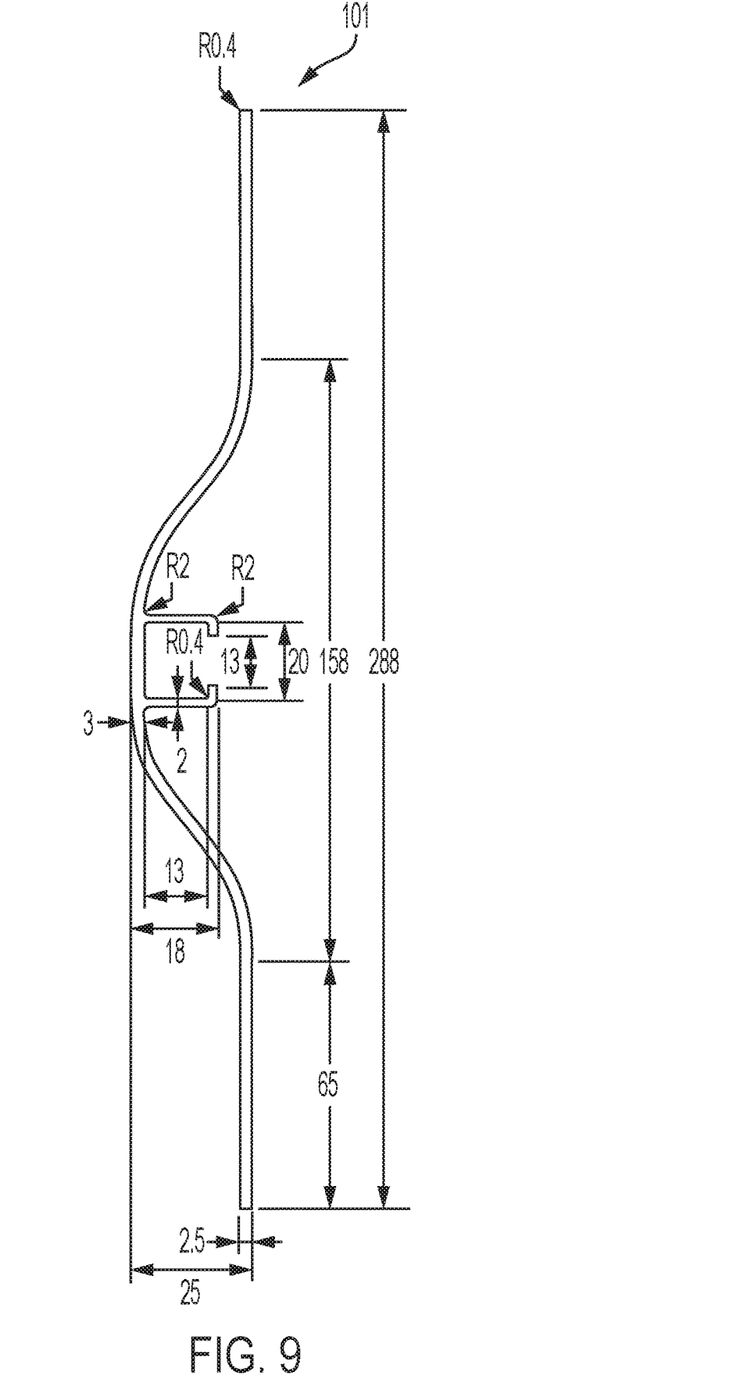
FIG. 9 shows a uniform vertical cross-section view of a mounting plate of the roof mount anchor having exemplary dimensions.

The mounting plate preferably curves smoothly between the side portions 104 and the raised central portion 103, thereby eliminating sharp transitions and/or planar surfaces which could compromise flexural stiffness. The roof attachment side portions 104 are coplanar so as to lie flat on the roof surface or cross ribs thereof. Exemplary dimensions are given in FIG. 9 wherein the mounting plate 101 may have a low profile height of less than 30 mm, such as approximately 25 mm which to maintain shear force resilience and flexural stiffness.

The mounting plate 101 may comprise an integrally formed channel 105 running longitudinally along an undersurface of the raised central portion 103. The channel 105 confers flexural stiffness to the raised central portion 103. As further illustrated in FIG. 1, the channel 105 may capture a locknut 107 of an anchor bolt 108.

Specifically, the mounting plate 101 may further comprise channel wall portions 106 (which are independent of the raised central portion 103 and side portions 104) which define the channel 105. The channel wall portions 106 may be parallel thereby defining parallel inner surfaces, and spaced to accommodate a minimum diameter of the locknut 107 and thereby to non-rotatably capture the locknut 107 within the channel 105.

Furthermore, the channel 105 may accommodate a central anchor point connection hole 112 along the length thereof, allowing a distal end of the anchor bolt 108 to protrude therethrough as shown in FIG. 2. Specifically, the channel 105 may further comprise inwardly projecting flange portions 109 from respective distal ends of the channel wall portions 106. The flange portions 109 may support the locknut 107 within the channel 105 whilst allowing a distal end of the anchor bolt 108 to extend therebetween.

The mounting plate 101 may be configured for installation along adjacent ribs of a roof profile surface, and/or wherein the horizontal axis 102 aligns along the pitch of the roof, or at least orientates towards an edge of the roof.

Figure 3:
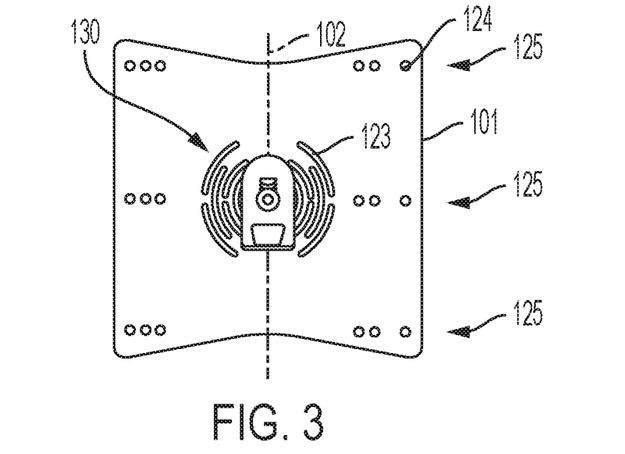
FIG. 3 shows a top plan view of the roof mount anchor.

With reference to FIG. 3, the roof attachment side portions 104 may comprise a plurality of rivet fastener holes 124. The rivet fastener holes 124 may run in spaced rows 125 across the horizontal axis 102. The rows 125 may have rivet fastener hole spacings suited for specific roof profile crest-to-crest widths. With reference to FIG. 1, the rivet fastener holes 124 in the rows 125 may be spaced apart in at least two intervals of 14 mm, 28 mm, 42 mm, 230 mm, 245 mm and 274 mm, from an edge of a roof attachment side 104 of the mounting plate 101.

In the embodiment shown in FIG. 3, the mounting plate 101 comprises three rows 125, however in embodiments, a mounting plate 101 having a different number of rows 125 is contemplated, including an embodiment wherein the mounting plate 101 has four rows 125.

The roof mount anchor 100 may comprise mounting pads 126 preferably of rubber material, which engage under each roof attachment side 104 of the mounting plate 101. The mounting pads 126 may comprise a plurality of fastener holes 127 which collocate with the rivet fastener holes 124 of the mounting plate 101.

As shown in FIG. 3, the mounting plate 101 may further splay longitudinally along the horizontal axis 102 towards both ends thereof.

Figure 4:
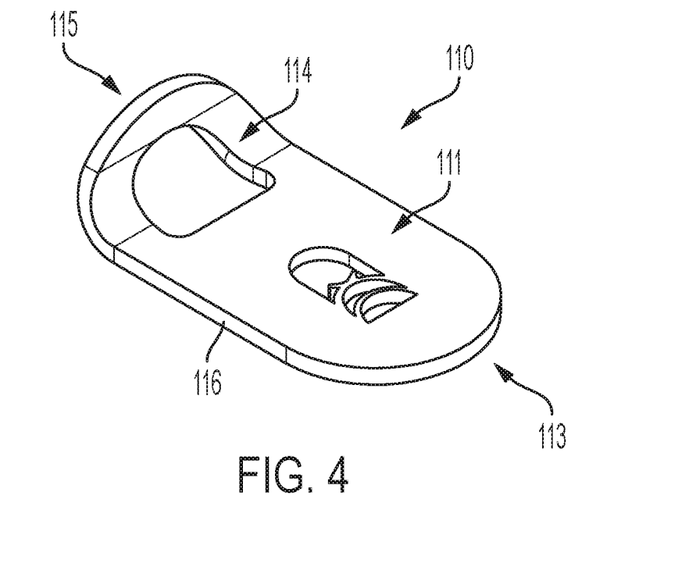
FIG. 4 shows a perspective view of a lanyard connector of the roof mount anchor.

The roof mount anchor 100 may further comprise a lanyard connector 110 attached to an apex of the raised central portion 103. With reference to FIG. 4, the lanyard connector 110 may define an anchor connection aperture 111 for swivel engagement by the anchor bolt 108 at a proximal end 113 thereof. The mounting plate 101 may accordingly comprise a central anchor point connection hole 112 for the anchor bolt 108.

The lanyard connector 110 may define an eyelet 114 towards a distal end 115 thereof, through which a carabiner or the like may attach a lanyard for tethering a user thereto.

The lanyard connector 110 may comprise a swivel eye anchor plate 116 which bends upwardly towards the distal end 115. The eyelet 114 may transition across the upwardly bent distal end 115.

Figure 5:
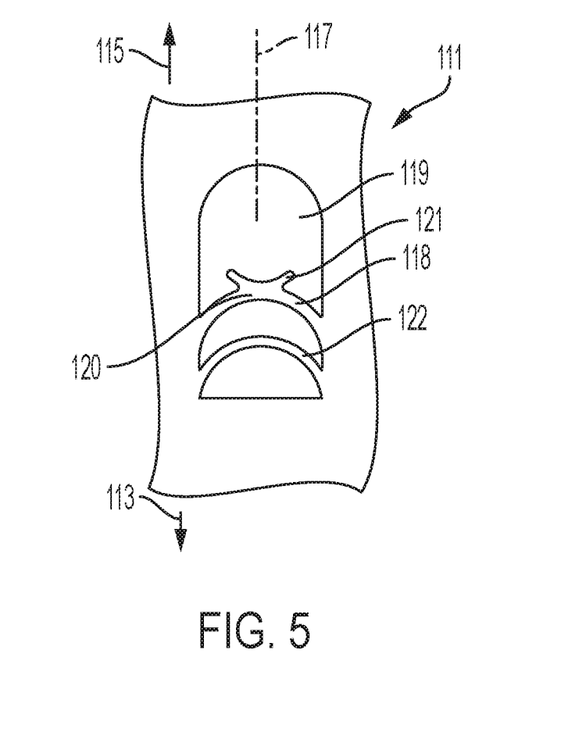
FIG. 5 shows a detail view of an anchor connection aperture of the lanyard connector in accordance with an embodiment.
Figure 6:
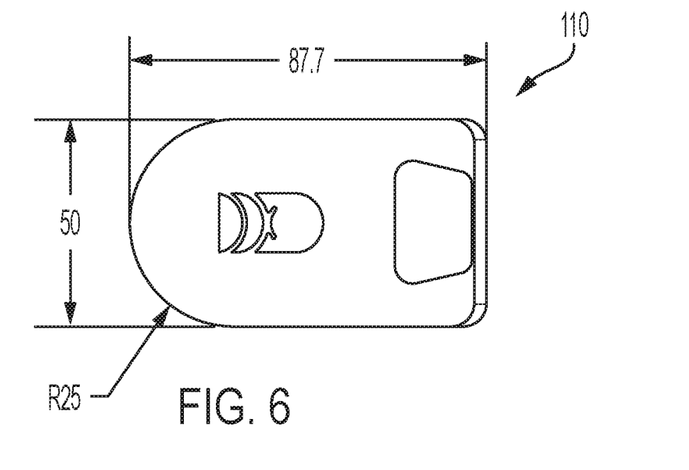
FIG. 6 shows a top plan view of the lanyard connector having exemplary dimensions.

With reference to FIG. 5, the anchor connection aperture 111 may be elongate along a strain absorbing axis 117 through the proximal end 113 and distal end 115 of the lanyard connector 110. The lanyard connector 110 may have an integrally formed primary frail web 118 across the strain absorbing axis 117. When strain is applied to the eyelet 114 of the lanyard connector 110, a resultant dynamic force is applied by the anchor bolt 108 against the primary frail web 118.

The anchor connection aperture 111 may define a profile open an anchor bolt accommodation portion 119 which accommodates the anchor bolt 108 therethrough. The primary frail web 118 is preferably curved across the anchor connection aperture 111. The primary frail web 118 is further preferably inversely orientated so that an apex 120 thereof bears oppositely against the anchor bolt 108. This arrangement is designed both to absorb energy and reduce shock impact on the user, whilst also providing visual indication of abnormal loading (such as in excess of 7 kN), which is useful when undertaking routine inspection of the fall arrest system The primary frail web 118 may have an integral seating profile 121 which supports the anchor bolt 108 centrally against the primary frail web apex 120. The seating profile 121 may have an opposite curvature to that of the primary frail web 118.

Figure 12:
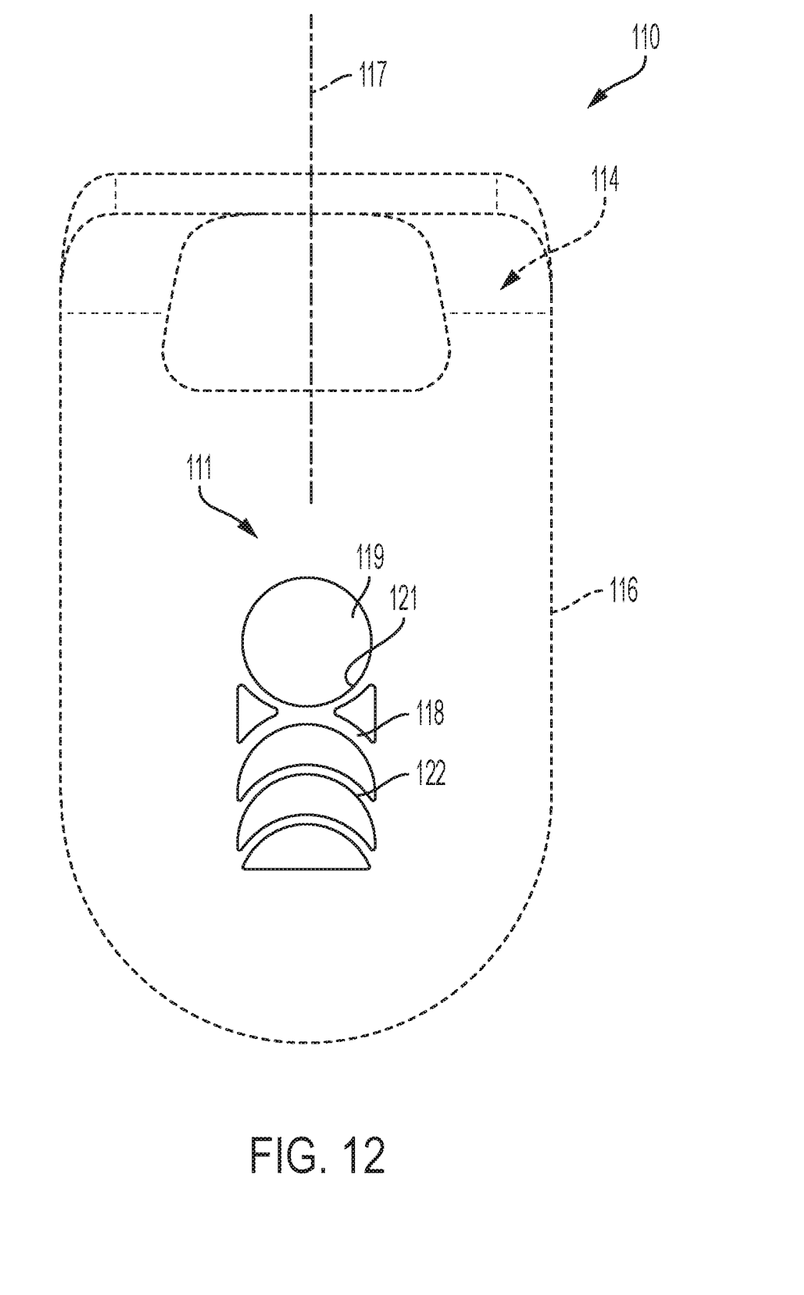
FIG. 12 shows a lanyard connector according to a further embodiment.

FIG. 12 shows an embodiment wherein the seating profile 121, extends right to the edges of the anchor bolt cut-out 119 of the anchor connection aperture 111, thereby not only seating the anchor bolt 108 centrally but also reinforcing the primary frail web 118. As such, according to this embodiment, the seating profile 121 may itself deform or fracture when the primary frail web 118 deforms under excessive load.

Figure 7:
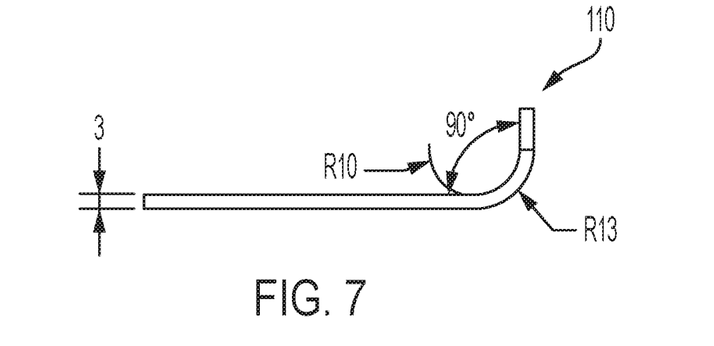
FIG. 7 shows a symmetrical left and right side view of the lanyard connector having exemplary dimensions.
Figure 8:
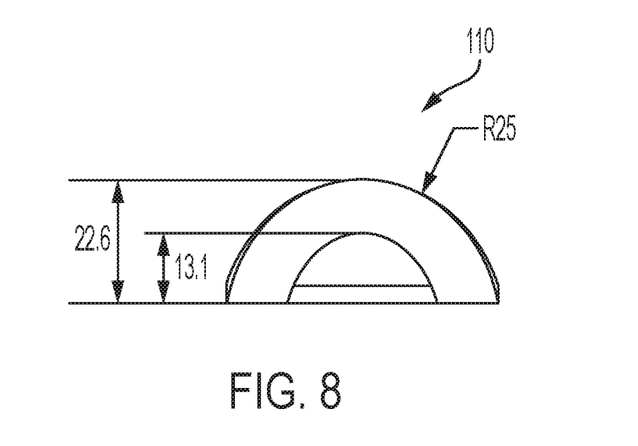
FIG. 8 shows a raised distal end view of the lanyard connector having exemplary dimensions.

The primary frail web 118 may have a thickness so as to visibly deform when a dynamic force of approximately 7 kN is applied to the lanyard connector 110. In this regard, with reference to FIGS. 7 and 10, the lanyard connector 110 may be stainless steel comprising a thickness of approximately 3 mm, and the primary frail web 118 width be approximately 1.5 mm. The primary frail web 118 may further absorb dynamic shock forces when deforming.

Figure 10:
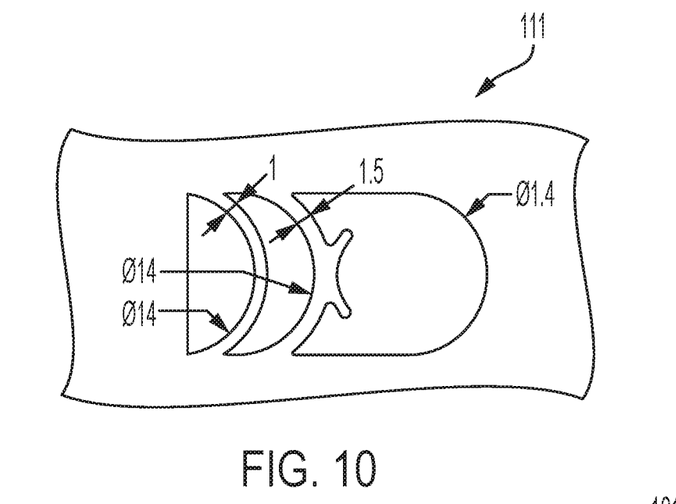
FIG. 10 shows a detail view of the anchor connection aperture of FIG. 5 having exemplary dimensions.
Figure 11:
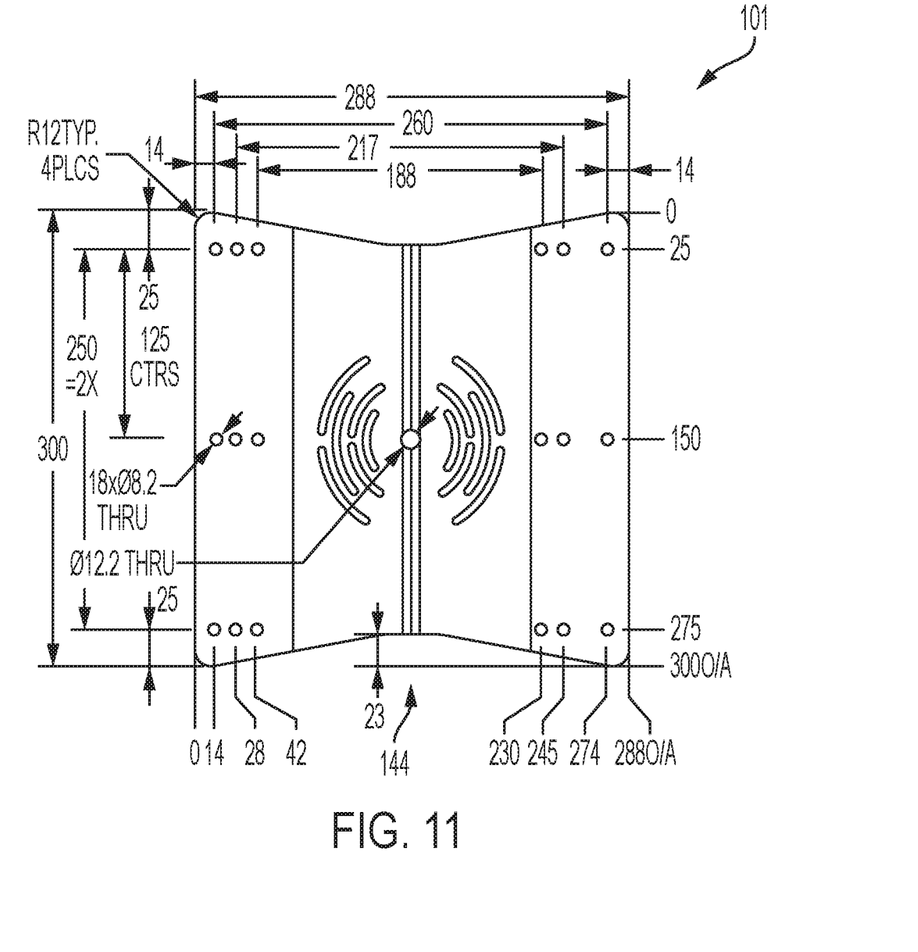
FIG. 11 shows a top plan view of the mounting plate of the roof mount anchor having exemplary dimensions.

The anchor connection aperture 111 may further comprise an integrally formed secondary frail web 122 across the strain absorbing axis 117. The secondary frail web 122 width may be narrower than the primary frail web 118 width, such as being approximately 1 mm as shown in FIG. 10.

With reference to FIGS. 1 and 3, the mounting plate 101 may comprise a matrix 130 of elongate stress relief cut-outs 123 surrounding the swivel eye anchor point. Each stress relief cut-out 123 may arc concentrically around the swivel eye anchor point.

Single and pairs of stress relief cut-outs 123 may locate symmetrically opposite the swivel eye anchor point connection hole 112, and may be arranged at different radial offsets. Furthermore, the stress relief cut-outs 123 arranged at different radial offsets from the swivel eye anchor point may overlap concentrically.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed, as obviously many modifications and variations are possible in view of the above teachings. The embodiments were chosen and described in order to best explain the principles of the invention and its practical applications, thereby enabling others skilled in the art to best utilise the invention and various embodiments, with various modifications as are suited to the particular use contemplated. It is intended that the following claims and their equivalents define the scope of the invention.

The invention claimed is:

1. A fall arrest roof mount anchor comprising a mounting plate having a uniform cross-section defining:
   a raised central portion;
   side portions for roof attachment; and
   an anchor bolt, wherein:
   the raised central portion has a swivel eye anchor point;
   the mounting plate further comprises channel wall portions independent of the raised central portion and the side portions, the channel wall portions projecting from an under surface of the raised central portion, thereby defining a channel extending along the under surface of the raised central portion and coinciding with the swivel eye anchor point;
   the channel wall portions project parallel to each other from the under surface of the raised central portion;
   the anchor point has a hole through an upper surface of the raised central portion into the channel thereunderneath;
   the anchor bolt extends through the hole and wherein the channel captures a locknut therefor, the channel preventing free rotation of the locknut; and
   the side portions being directly attached to and extending continuously from the raised central portion.

2. The anchor as claimed in claim 1, wherein inner parallel side portions of the channel are spaced according to a minimum diameter of the locknut to non-rotatably capture the locknut.

3. The anchor as claimed in claim 1, wherein the channel wall portions define a gap therebetween to allow a distal end of the anchor bolt to extend therethrough when the locknut is captured by the channel.

4. The anchor as claimed in claim 1, wherein the mounting plate further comprises inwardly extending flange portions from respective distal ends of the channel wall portions, and wherein the inwardly extending flange portions support the locknut within the channel whilst allowing the distal end of the anchor bolt to extend therebetween.

5. The anchor as claimed in claim 1, wherein the mounting plate comprises a matrix of elongate stress relief cut-outs surrounding the swivel eye anchor point, and wherein the stress relief cut-outs arc concentrically around the swivel eye anchor point, and ends of radially adjacent stress relief cut-outs overlap.

6. The anchor as claimed in claim 5, wherein opposing pairs of stress relief cut-outs are arranged symmetrically around the swivel eye anchor point.

7. The anchor as claimed in claim 1, wherein the mounting plate curves smoothly between the raised central portion and the roof attachment side portions.

8. The anchor as claimed in claim 1, wherein the roof attachment side portions are coplanar.

9. The anchor as claimed in claim 1, wherein the mounting plate is less than 30 mm high.

10. The anchor as claimed in claim 1, wherein the side portions comprise a plurality of rivet fastener holes arranged in rows spaced across the mounting plate.

11. The anchor as claimed in claim 10, wherein the rows of rivet fastener holes are spaced apart in at least two intervals of 14 mm, 28 mm, 42 mm, 230 mm, 245 mm and 274 mm, from an edge of a roof attachment side of the mounting plate.

12. The anchor as claimed in claim 11, wherein the rows of rivet fastener holes are greater than 180 mm apart.

13. The anchor as claimed in claim 1, further comprising a lanyard connector attached to the raised central portion and wherein the lanyard connector swivels about the swivel eye anchor point.

14. The anchor as claimed in claim 13, wherein a distal end of the lanyard connector has an eyelet.

15. The anchor as claimed in claim 14, wherein the lanyard connector comprises a swivel eye anchor plate which bends upwardly towards the distal end.

16. The anchor as claimed in claim 15, wherein the eyelet transitions the upwardly bent distal end.

17. The anchor as claimed in claim 13, wherein a proximal end of the lanyard connector comprises a swivel eye anchor point connection aperture for an anchor bolt.

18. A fall arrest roof mount anchor comprising a mounting plate having a uniform cross-section defining:
   a raised central portion; and
   side portions for roof attachment, and wherein:
   the raised central portion has a swivel eye anchor point;
   the mounting plate further comprises channel wall portions independent of the raised central portion and the side portions, the channel wall portions projecting from an under surface of the raised central portion, thereby defining a channel extending along the under surface of the raised central portion and coinciding with the swivel eye anchor point; and
   the mounting plate comprises a matrix of elongate stress relief cut-outs surrounding the swivel eye anchor point, and wherein the stress relief cut-outs arc concentrically around the swivel eye anchor point, and ends of radially adjacent stress relief cut-outs overlap.

19. A fall arrest roof mount anchor comprising a mounting plate having a uniform cross-section defining:
- a raised central portion;
- side portions for roof attachment; and
- a lanyard connector attached to the raised central portion, and wherein:
- the raised central portion has a swivel eye anchor point;
- the mounting plate further comprises channel wall portions independent of the raised central portion and the side portions, the channel wall portions projecting from an under surface of the raised central portion, thereby defining a channel extending along the under surface of the raised central portion and coinciding with the swivel eye anchor point;
- the lanyard connector swivels about the swivel eye anchor point;
- a distal end of the lanyard connector has an eyelet; and
- the lanyard connector comprises a swivel eye anchor plate which bends upwardly towards the distal end.

* * * * *